US012700612B2

(12) United States Patent
     Han

(10) Patent No.: US 12,700,612 B2
(45) Date of Patent: Aug. 4, 2026

(54) ELECTRODE ASSEMBLY

(71) Applicant: LG Energy Solution, Ltd., Seoul (KR)

(72) Inventor: Hyun Gyu Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 705 days.

(21) Appl. No.: 18/017,979

(22) PCT Filed: Jul. 21, 2022

(86) PCT No.: PCT/KR2022/010701
§ 371 (c)(1),
(2) Date: Jan. 25, 2023

(87) PCT Pub. No.: WO2023/018054
PCT Pub. Date: Feb. 16, 2023

(65) Prior Publication Data
US 2024/0274861 A1      Aug. 15, 2024

(30) Foreign Application Priority Data
Aug. 10, 2021    (KR) ........................ 10-2021-0105389

(51) Int. Cl.
*H01M 10/04* (2006.01)
*H01M 50/538* (2021.01)

(52) U.S. Cl.
CPC ..... *H01M 10/045* (2013.01); *H01M 10/0459* (2013.01); *H01M 50/538* (2021.01)

(58) Field of Classification Search
CPC ........... H01M 10/045; H01M 10/0459; H01M 50/538; H01M 10/04; H01M 10/0454;
(Continued)

(56) References Cited

U.S. PATENT DOCUMENTS

2011/0104567 A1* 5/2011 Lee ..................... H01M 10/125
                                                        429/211
2011/0305938 A1* 12/2011 Yamamoto ........ H01M 10/0459
                                                        29/25.41
(Continued)

FOREIGN PATENT DOCUMENTS

CN        108604704 A      9/2018
CN        109962200 A      7/2019
(Continued)

OTHER PUBLICATIONS

Chen, Toward High-Areal-Capacity Electrodes for Lithium and Sodium Ion Batteries, Advanced Energy Materials (2022). (Year: 2022).*

(Continued)

*Primary Examiner* — Matthew T Martin
*Assistant Examiner* — Bartholomew A Hornsby
(74) *Attorney, Agent, or Firm* — Lerner David LLP

(57) ABSTRACT

An electrode assembly may have improved rigidity by including a structure in which a negative electrode having separators disposed on both surfaces thereof is bent in a zigzag shape, and a plurality of positive electrodes are individually inserted inside separators bent together with the negative electrode, thereby realizing high safety of the battery. Further, the electrode assembly of the present invention may prevent an end portion of an inserted positive electrode from being exposed by realizing a variation between a separation distance of an end portion of any positive electrode and a separation distance of an end portion of a positive electrode adjacent to the positive electrode with respect to a side surface including the bent structure of the negative electrode at a predetermined ratio, so that the safety and energy density of the battery can be improved.

11 Claims, 4 Drawing Sheets

(58) Field of Classification Search
CPC .......... H01M 10/0585; H01M 50/466; H01M 50/531; H01M 10/0583; H01M 50/489; H01M 50/54; H01M 50/548; H01M 10/0525; H01M 50/178; H01M 2004/021; Y02E 60/10; Y02P 70/50
See application file for complete search history.

(56) References Cited

U.S. PATENT DOCUMENTS

| | | | |
|---|---|---|---|
| 2012/0058387 A1 | 3/2012 | Ahn | |
| 2014/0335394 A1* | 11/2014 | Krehl | ..................... H01G 11/46 |
| | | | 29/25.03 |
| 2019/0044177 A1 | 2/2019 | Lee et al. | |
| 2020/0127334 A1 | 4/2020 | Pyo et al. | |
| 2020/0235434 A1 | 7/2020 | Lee et al. | |
| 2021/0184242 A1 | 6/2021 | Lee et al. | |
| 2022/0021016 A1* | 1/2022 | Zhao | ................... H01M 10/045 |

FOREIGN PATENT DOCUMENTS

| | | |
|---|---|---|
| CN | 112467230 A | 3/2021 |
| JP | 2010199281 A | 9/2010 |
| JP | 2018532240 A | 11/2018 |
| JP | 2019053819 A | 4/2019 |
| JP | 2019079711 A | 5/2019 |
| KR | 20110048839 A | 5/2011 |
| KR | 101084075 B1 | 11/2011 |
| KR | 101252400 B1 | 4/2013 |
| KR | 20130103202 A | 9/2013 |
| KR | 20130112591 A | 10/2013 |
| KR | 20130131843 A | 12/2013 |
| KR | 101387137 B1 | 4/2014 |
| KR | 20170019791 A | 2/2017 |
| KR | 20180049537 A | 5/2018 |
| KR | 20180106408 A | 10/2018 |
| KR | 101933950 B1 | 1/2019 |
| KR | 20190054491 A | 5/2019 |
| KR | 102023530 B1 | 9/2019 |
| KR | 20200057978 A | 5/2020 |
| WO | 2021109363 A1 | 6/2021 |

OTHER PUBLICATIONS

International Search Report for Application No. PCT/KR2022/010701 mailed Oct. 28, 2022 , pp. 1-3. [See p. 2, categorizing the cited references].
Extended European Search Report including Written Opinion for Application No. 22847522.4 dated Nov. 14, 2024, pp. 1-9.
Search Report dated May 14, 2026 from the Office Action for Chinese Application No. 202280006114.X issued May 21, 2026, pp. 1-3.

* cited by examiner

【Fig. 1】
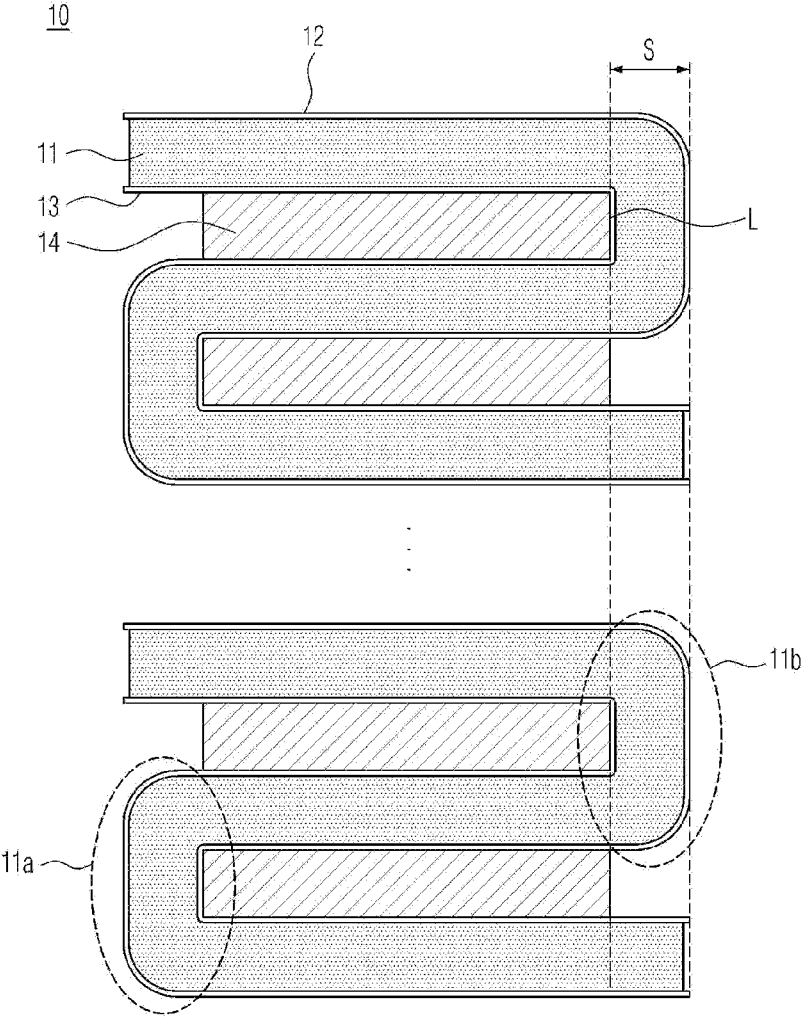

【Fig. 2】
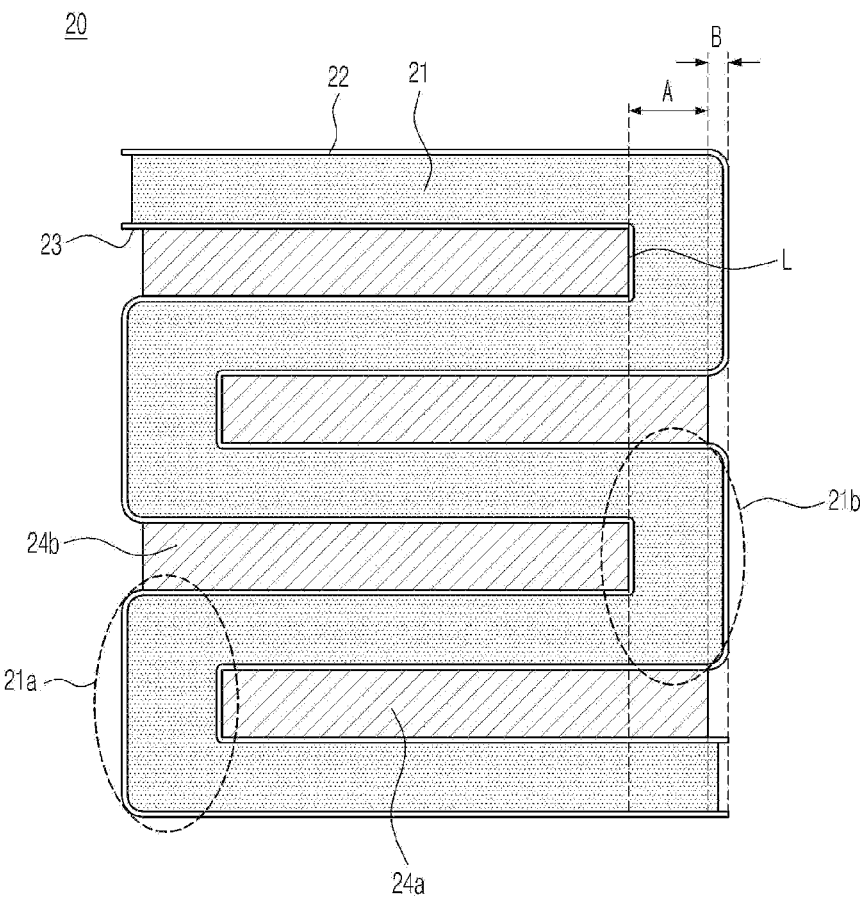

【Fig. 3】
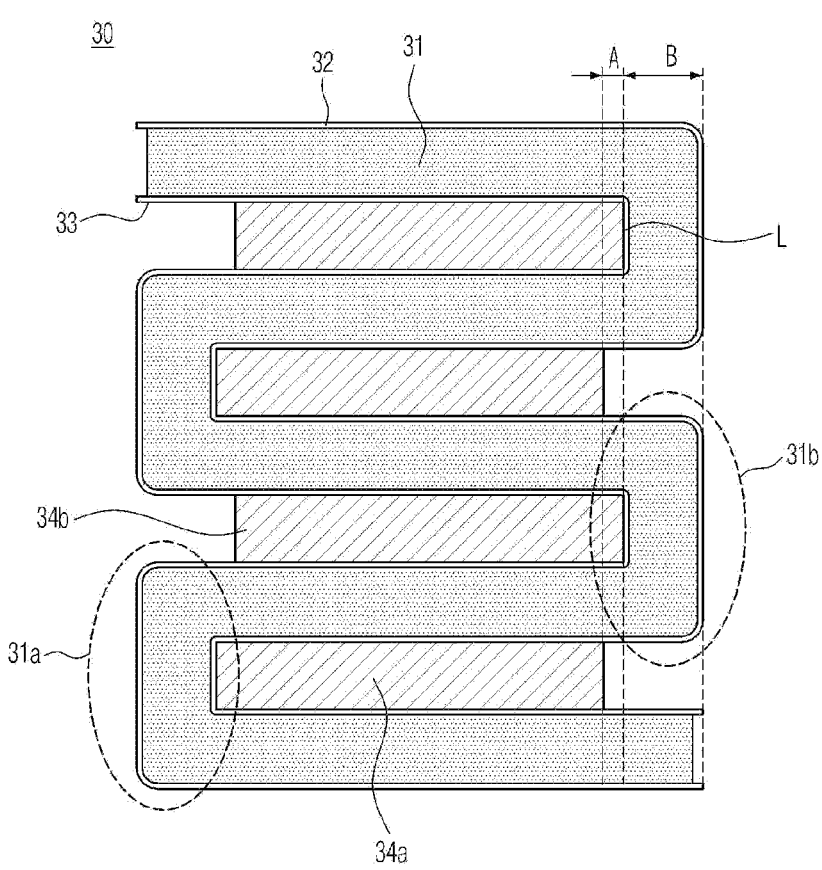

【Fig. 4】
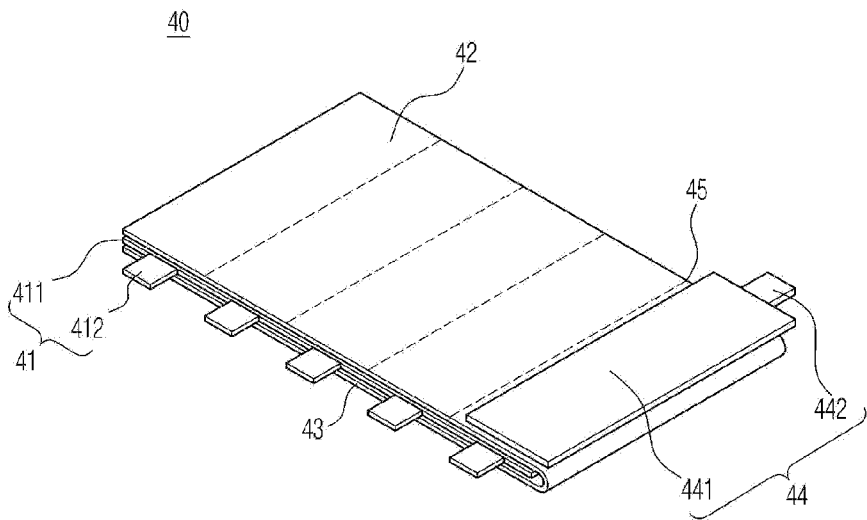
【Fig. 5】
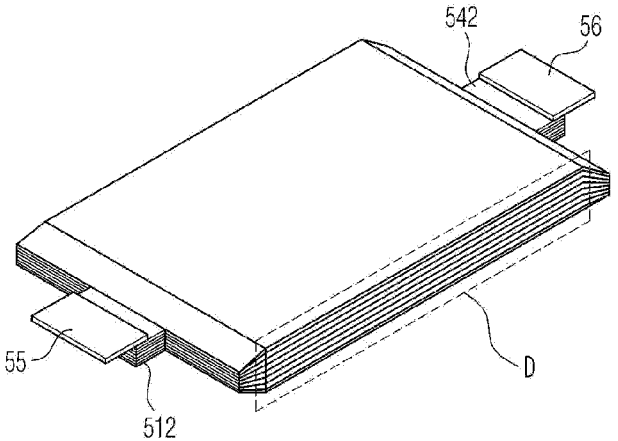

ELECTRODE ASSEMBLY

CROSS-REFERENCE TO RELATED APPLICATIONS

The present application is a national phase entry under 35 U.S.C. § 371 of International Application No. PCT/KR2022/010701 filed on Jul. 21, 2022, which claims priority from Korean Patent Application No. 10-2021-0105389, filed on Aug. 10, 2021, all of which are incorporated herein by reference.

TECHNICAL FIELD

The present invention relates to an electrode assembly.

BACKGROUND ART

Currently, in the development of electric vehicles, medium- and large-sized lithium secondary batteries are mostly applied as energy sources, and thus the development thereof is predominantly in progress, and further, research on medium- and large-sized lithium secondary batteries as energy storage media is expected to continuously progress in the field of power storage associated with renewable energy and smart grids.

A lithium secondary battery includes an electrode assembly formed by stacking or winding a positive electrode, a negative electrode, and a separator, and a metal case or pouch in which the electrode assembly and an electrolyte are embedded.

Here, in a small-sized secondary battery of which negative and positive electrodes are small in size, the electrodes may be easily handled, and productivity for stacking and winding processes may be relatively easily secured. However, in a process of stacking and winding a positive electrode, a separator, and a negative electrode for a medium- or large-sized secondary battery, improving productivity as well as securing battery safety remains as a major challenge.

Specifically, when a positive electrode is out of an outermost side of a negative electrode in a stack-type electrode assembly in which the positive electrode, a separator, and the negative electrode are stacked, lithium ions may be precipitated at an outermost side of the electrode assembly as charging and discharging proceed. That is, alignment defects of the positive electrode and the negative electrode may be generated.

Further, in an end portion of a side surface of the stack-type electrode assembly, in which a folding direction is switched, the separator is stacked in a single-layer structure, and thus the side surface of the electrode assembly may be easily damaged by an external impact, an active material may be finely deintercalated, and the positive and negative electrodes may be folded.

In addition, in a jelly-roll type electrode assembly in which a positive electrode, a separator, and a negative electrode are wound, an active material may be deintercalated or cracks may be generated at corner portions of the positive and negative electrodes as winding and pressing processes are performed. The deintercalated active material may cause a short circuit or damage to the separator while circulating inside the secondary battery.

Thus, an electrode assembly in which a positive electrode and a negative electrode are assembled with a separator bent in a zigzag manner interposed therebetween has been developed. However, the conventionally developed zigzag type electrode assembly has a limitation in that it is difficult to secure the rigidity of the electrode assembly because a bent portion is composed of only the separator, and an energy density is low because a capacity per unit area of the assembled positive electrode is small.

DISCLOSURE

Technical Problem

An object of the present invention is to provide an electrode assembly and a secondary battery including the same, allowing productivity to be increased in the manufacture of batteries and high battery safety and energy density to be realized.

Technical Solution

In order to solve the above-mentioned problem, one embodiment of the present invention provides an electrode assembly including a positive electrode, a negative electrode, and separators, wherein the negative electrode has a stacked structure in which the separators are disposed on both surfaces thereof and bent m times (where m is an integer satisfying $2 \leq m \leq 100$) in a zigzag shape, the positive electrode has a structure in which n+1 positive electrodes (where n is an integer satisfying $1 \leq n \leq 99$ and m=n+1) are individually inserted inside the separators bent along the negative electrode, and a separation distance of an end portion of an $n^{th}$ inserted positive electrode and a separation distance of an end portion of an $(n+1)^{th}$ inserted positive electrode with respect to a side surface including the bent structure of the negative electrode have a variation of 10 μm to 2 mm.

At this time, the separation distance of the end portion of the nth inserted positive electrode and the separation distance of the end portion of the $(n+1)^{th}$ inserted positive electrode with respect to the side surface of the electrode assembly including the bent structure of the negative electrode may have a variation of 10 μm to 500 μm.

Further, the separation distance of the end portion of the $n^{th}$ inserted positive electrode and the separation distance of the end portion of the $(n+1)^{th}$ inserted positive electrode with respect to the side surface of the electrode assembly including the bent structure of the negative electrode may have a variation of 500 μm to 2,000 μm.

In addition, a separation distance of an end portion of the positive electrode, on the other side of the end portion inserted inside the separators, with respect to the same side surface of the electrode assembly may be in a range of 50 μm to 150 μm or 400 μm to 2,000 μm.

Further, an average thickness of the negative electrode may be in a range of 50 μm to 500 μm.

In addition, an average thickness of the separator may be in a range of 5 μm to 100 μm.

Further, an average thickness of the positive electrode may be in a range of 50 μm to 500 μm.

In addition, the negative electrode may have a stacked structure in which the separators are disposed on both surfaces thereof and bent 20 times to 60 times in a zigzag shape.

Furthermore, one embodiment of the present invention provides a secondary battery including an electrode assembly including a positive electrode, a negative electrode, and separators, wherein the negative electrode has a stacked structure in which the separators are disposed on both surfaces thereof and bent m times (where m is an integer satisfying 2≤m≤100) in a zigzag shape, the positive electrode has a structure in which n+1 positive electrodes (where n is an integer satisfying 1≤n≤99 and m=n+1) are individually inserted inside the separators bent along the negative electrode, and a separation distance of an end portion of an $n^{th}$ inserted positive electrode and a separation distance of an end portion of an $(n+1)^{th}$ inserted positive electrode with respect to a side surface including the bent structure of the negative electrode have a variation of 10 μm to 2 mm, and a case in which the electrode assembly and an electrolyte are embedded.

Here, the secondary battery may include a positive electrode tab and a negative electrode tab that are respectively connected to the positive electrode and the negative electrode of the electrode assembly and are withdrawn to the outside of the case, and the positive electrode tab and the negative electrode tab may be located on a side surface of the electrode assembly adjacent to the side surface including the bent structure of the negative electrode.

Advantageous Effects

An electrode assembly according to the present invention can realize high safety of a battery by having a structure in which a negative electrode having separators disposed on both surfaces thereof is bent in a zigzag shape, and a plurality of positive electrodes are individually inserted inside separators bent together with the negative electrode to improve rigidity of the electrode assembly.

Further, an electrode assembly of the present invention can prevent an end portion of an inserted positive electrode from being exposed by realizing a variation between a separation distance of an end portion of any positive electrode and a separation distance of an end portion of a positive electrode adjacent to the positive electrode with respect to a side surface including the bent structure of the negative electrode at a predetermined ratio, so that the safety of the battery can be improved and also a unit area of the inserted positive electrode can be increased, thereby improving energy density of battery.

BRIEF DESCRIPTION OF THE DRAWINGS

FIG. 1 is a cross-sectional view illustrating a structure of a conventional electrode assembly.

FIG. 2 is a cross-sectional view illustrating an example of an electrode assembly according to the present invention.

FIG. 3 is a cross-sectional view illustrating another example of the electrode assembly according to the present invention.

FIG. 4 is a perspective view illustrating structure of the electrode assembly according to the present invention before a negative electrode is bent.

FIG. 5 is a perspective view illustrating a structure of an electrode assembly manufactured by bending the negative electrode of FIG. 4.

BEST MODE

While the present invention is susceptible to various modifications and alternative forms, specific embodiments thereof will herein be described in detail.

It should be understood, however, that there is no intent to limit the present invention to the particular forms disclosed, but on the contrary, the present invention is to cover all modifications, equivalents, and alternatives falling within the spirit and scope of the present invention.

It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Further, when it is stated herein that a portion of a layer, film, area, plate, and the like is "on" another portion, the statement includes the meaning of the portion "being directly on" the other portion in addition to still another portion being interposed therebetween. In contrast, when it is stated that a portion of a layer, film, area, plate, and the like is "below" another portion, the statement includes the meaning of the portion "being directly below" the other portion in addition to still another portion being interposed therebetween. In addition, when it is stated herein that an element is disposed "on" a certain element, it may mean not only that the element is disposed above the certain element but also that the element is disposed below the certain element.

Hereinafter, the present invention will be described in more detail.

Electrode Assembly

An embodiment of the present invention provides an electrode assembly including positive electrodes, a negative electrode, and separators, wherein the negative electrode has a stacked structure in which the separators are disposed on both surfaces thereof and bent m times (where m is an integer satisfying 2≤m≤100) in a zigzag shape, the positive electrode has a structure in which n+1 positive electrodes (where n is an integer satisfying 1≤n≤99 and m=n+1) are individually inserted inside the separators bent along the negative electrode, and a separation distance of an end portion of an $n^{th}$ inserted positive electrode and a separation distance of an end portion of an $(n+1)^{th}$ inserted positive electrode with respect to a side surface including the bent structure of the negative electrode have a variation of 10 μm to 2 mm.

FIGS. 2 and 3 are cross-sectional views illustrating structures of electrode assemblies 20 and 30 according to the present invention, and hereinafter, a configuration of the electrode assembly 20 according to the present invention will be described with reference to FIG. 2.

The electrode assembly 20 according to the present invention has a configuration including positive electrodes 24a and 24b, a negative electrode 21, and separators 22 and 23. Here, the negative electrode 21 has a band shape, and the separators 22 and 23 may be disposed on both surfaces of the negative electrode 21 to adhere thereto. Specifically, the separators 22 and 23 may be in contact with or adhered to both surfaces of the negative electrode 21 by using an adhesive means such as an adhesive or by a lamination method using heat and pressure. Accordingly, during charging and discharging of the battery, the separators 22 and 23 may be prevented from shrinking, and may support the negative electrode 21 having a large area and a small thickness to provide mechanical strength to the large-sized negative electrode 21, so that damage or breakage of the negative electrode 21 may be prevented.

Further, since the negative electrode 21 is formed in a band shape, the negative electrode 21 may be provided as a single layer in the electrode assembly 20. Accordingly, as compared with a case in which the negative electrode 21 is formed in a plate shape, deintercalation of a negative electrode active material, which may occur when the negative electrode is cut one by one, may be minimized, and the occurrence of foreign substances may be minimized, so that a cleaning operation may be simplified in a manufacturing process.

In addition, the negative electrode 21 having the separators 22 and 23 disposed on both surfaces thereof may be stacked in a zigzag structure that is folded by being bent m times (where m is an integer satisfying 2≤m≤100) alternately in opposite directions in a state of overlapping each other, and may have a structure in which n+1 positive electrodes 24a and 24b (where n is an integer satisfying 1≤n≤99 and m=n+1) are individually inserted inside the separators 22 and 23 bent along the negative electrode 21.

At this time, the positive electrodes 24a and 24b may each be formed in a cut plate shape to be completely inserted inside the bent separators 22 and 23 and negative electrode 21, and the plurality of positive electrodes 24a and 24b inserted inside the bent separators 22 and 23 may have the same length, thickness, and width.

In addition, because the separators 22 and 23 disposed on both surfaces of the negative electrode 21 are bent m times (where m is an integer satisfying 2≤m≤100), and the n+1 positive electrodes 24a and 24b (where n is an integer satisfying 1≤n≤99 and m=n+1) are individually inserted inside the bent separators 22 and 23, the negative electrode 21 having the separators 22 and 23 on both surfaces thereof may be disposed on an outermost side of the manufactured electrode assembly 20.

In addition, the zigzag structure includes "bent portions 21a and 21b" formed by the separators 22 and 23 and the negative electrode 21 being bent and folded, and a number of the parallel bent portions 21a and 21b corresponding to the number of times the separators 22 and 23 and negative electrode 21 are bent may be formed, and may allow the positive electrodes 24a and 24b inserted inside the separators 22 and 23 and negative electrode 21 to be aligned, and at the same time, prevent stress from being applied to the positive electrodes and prevent a positive electrode active material coated on the positive electrodes 24a and 24b from being deintercalated. In addition, the zigzag structure may realize a structure in which the positive electrodes 24a and 24b are completely surrounded by the negative electrode 21 with the separators 22 and 23 as boundaries, so that a phenomenon in which lithium ions are precipitated from the outermost side of the electrode assembly during charging and discharging of the battery as the positive electrode 24a and 24b is exposed to the outside may be prevented.

In addition, the number m of times the separators 22 and 23 and the negative electrode 21 are bent and stacked may be in a range of 2 times to 100 times, and more specifically, 2 times to 80 times, 2 times to 60 times, 2 times to 40 times, 2 times to 20 times, 2 times to 50 times, 5 times to 30 times, 10 times to 50 times, 20 times to 30 times, 10 times to 15 times, 10 times to 70 times, 20 times to 60 times, 30 times to 60 times, 20 to 40 times, 40 times to 60 times, 2 times to 15 times, 2 times to 13 times, 2 times to 11 times, 2 times to 9 times, 2 times to 7 times, or 2 times to 5 times. In the present invention, the number of the stacked positive electrodes 24a and 24b and negative electrode 21 may be easily increased without excessively increasing a volume of the electrode assembly 20 by controlling the number of times the separators 22 and 23 and negative electrode 21 are bent as described above, so that energy density of the electrode assembly 20 may be improved.

Furthermore, any positive electrode 24a inserted inside the separators 22 and 23 bent along the negative electrode 21 may be inserted and stacked such that both end portions thereof are misaligned with those of the positive electrode 24b adjacent thereto. Accordingly, separation distances of end portions located on the same side surface of the electrode assembly 20, of any of the positive electrodes 24a and the adjacent positive electrode 24b, with respect to a side surface of the electrode assembly 20 having a bent structure of the negative electrode 21, that is, the bent portion, may have a variation A of a predetermined range. Specifically, the variation A may be in a range of 10 μm to 2 mm, and more specifically, 10 μm to 1,500 μm, 10 μm to 1,200 μm, 10 μm to 1,000 μm, 10 μm to 500 μm, 100 μm to 2,000 μm, 200 μm to 1,500 μm, 400 μm to 1,800 μm, 200 μm to 1,200 μm, 200 μm to 800 μm, or 700 μm to 1,500 μm.

As an example, as shown in FIG. 2, a separation distance B of the end portion of the nth inserted positive electrode 24a (where n is an integer satisfying 1≤n≤19) and a separation distance A+B of the end portion of the (n+1)th inserted positive electrode 24b with respect to the side surface of the electrode assembly 20 having the bent structure of the negative electrode 21 may have the variation A in a range of 10 μm to 500 μm, and specifically, 10 μm to 450 μm, 10 μm to 400 μm, 50 μm to 400 μm, 80 μm to 380 μm, 80 μm to 350 μm, 100 μm to 400 μm, 120 μm to 380 μm, 120 μm to 350 μm, 140 μm to 290 μm, or 210 μm to 290 μm.

As another example, as shown in FIG. 3, a separation distance A+B of an end portion of an $n^{th}$ inserted positive electrode 34a (where n is an integer satisfying 1≤n≤19) and a separation distance B of an end portion of an $(n+1)^{th}$ inserted positive electrode 34b with respect to a side surface of the electrode assembly 30 having a bent structure of a negative electrode 31 may have a variation A in a range of 500 μm to 2,000 μm, and specifically, 500 μm to 1,900 μm, 500 μm to 1,700 μm, 500 μm to 1,500 μm, 500 μm to 1,000 μm, 500 μm to 800 μm, 750 μm to 1,800 μm, 750 μm to 1,300 μm, 1,000 μm to 1,900 μm, 1,200 μm to 1,700 μm, or 900 μm to 1,400 μm.

In the present invention, each of a plurality of positive electrodes 24a, 24b, 34a, and 34b are inserted inside the bent portions 21a, 21b, 31a, and 31b so that both end portions thereof are misaligned to satisfy the above range, so that the battery may be manufactured with high process efficiency as compared with the case in which positive electrodes 14 are stacked in parallel such that both end portions thereof are not misaligned as shown in FIG. 1. In addition, when both end portions of each of the positive electrodes 24a and 24b are misaligned as in the structure shown in FIG. 2, the energy density of the electrode assembly 20 may be maximized, and when both end portions of each of the positive electrodes 34a and 34b are misaligned as in the structure shown in FIG. 3, a structure in which both end portions of each of the positive electrodes 34a and 34b are completely surrounded by the negative electrode 31 may be realized, so that the safety of the electrode assembly may be further improved.

Further, end portions of the positive electrodes 24a and 24b on the other side of the end portions inserted inside the separators 22 and 23 may each have a separation distance of a predetermined range with respect to the same side surface of the electrode assembly 20.

As an example, as shown in FIG. 2, with respect to the same side surface of the electrode assembly 20, end portions of the positive electrodes 24a and 24b on the other side of the end portions inserted inside the separators 22 and 23 may each have a separation distance B in a range of 50 μm to 150 μm, and specifically, 80 μm to 120 μm, 100 μm to 140 μm, 50 μm to 120 μm, 50 μm to 100 μm, 90 μm to 115 μm, 50 μm to 80 μm, or 60 μm to 90 μm.

As another example, as shown in FIG. 3, with respect to the same side surface of the electrode assembly 30, end portions of the positive electrodes 34a and 34b on the other side of the end portions inserted inside separators 32 and 33 may each have a separation distance A+B in a range of 400 μm to 2,000 μm, and specifically, 400 μm to 1,200 μm, 600 μm to 1,200 μm, 400 μm to 1,000 μm, 600 μm to 1,000 μm, 400 μm to 800 μm, 800 μm to 1,200 μm, 800 μm to 1,000 μm, 1,000 μm to 1,500 μm, 1,000 μm to 1,200 μm, 1,200 μm to 2,000 μm, 1,500 μm to 2,000 μm, or 1,400 μm to 1,700 μm.

In the present invention, by controlling the separation distances B and A+B of end portions of the positive electrodes 24a, 24b, 34a, and 34b on the other side of the end portions inserted inside the separators 22, 23, 32, and 33 with respect to the same side surface of the electrode assemblies 20 and 30 to be in the above-described ranges, the energy density and safety of the battery including the electrode assemblies 20 and 30 may be simultaneously improved.

Furthermore, the electrode assembly according to the present invention has a configuration in which the separation distances B and A+B of the end portions of the positive electrodes located on the same side surface with respect to the side surface of the electrode assembly including the bent portion and the variation A of the separation distances of any positive electrode and the adjacent positive electrode satisfy the above-described ranges, and the configuration may be controlled by a length of each of the negative electrode and the positive electrode in a bending direction during a manufacturing process of the electrode assembly, an insertion speed when the positive electrode is inserted, an average thickness of the positive electrode, the negative electrode, and the separator, and the like, but the present invention is not limited thereto.

Meanwhile, the negative electrode 21 may be manufactured in a structure in which a negative electrode mixture layer is formed on a copper current collector by mixing a negative electrode active material including at least one of carbon-based, hard carbon, natural graphite, artificial graphite, graphitic carbon, coke-based carbon, silicon (Si), and silicon oxide (SiOx, where 0.8≤x≤2.5) with a binder, and applying the mixture onto at least one surface of a band-shaped copper current collector having oxidation resistance, followed by drying. At this time, the mixture of the negative electrode active material and the binder may further include a conductive material, a filler, or the like.

In addition, the positive electrodes 24a and 24b may be manufactured in a structure in which a positive electrode mixture layer is formed on an aluminum current collector by mixing a positive electrode active material including at least one of lithium cobalt oxide ($LiCoO_2$), lithium iron phosphate ($LiFePO_4$), lithium nickel oxide ($LiNiO_2$), lithium manganese oxide ($LiMn_2O_4$), and lithium nickel cobalt manganese oxide ($LiNi_{1/3}Co_{1/3}Mn_{1/3}O_2$, $LiNi_{0.6}Co_{0.2}Mn_{0.2}O_2$, $LiNi_{0.8}Co_{0.1}Mn_{0.1}O_2$, $LiNi_{0.9}Co_{0.05}Mn_{0.05}O_2$, $LiNi_{0.8}Co_{0.1}Mn_{0.05}Al_{0.05}O_2$, and $LiNi_{0.7}Co_{0.1}Mn_{0.1}Al_{0.1}O_2$) with a binder, and applying the mixture onto at least one surface of an aluminum current collector, followed by drying. In this case, the positive electrode mixture layer may have a higher application thickness as compared to the negative electrode mixture layer, and similar to the negative electrode 21, the mixture of the positive electrode active material and the binder may further include a conductive material, a filler, and the like. In addition, the positive electrodes 24a and 24b may be cut into a plate shape after the positive electrode mixture layer is formed, and a length of each of the cut positive electrodes 24a and 24b in a direction in which they are inserted into the electrode assembly, that is, in a direction in which they are inserted inside the bent separators 22 and 23, may be equal to a length of each of the positive electrode mixture layer and the aluminum current collector included in the positive electrodes 24a and 24b.

In addition, the positive electrodes 24a and 24b and the negative electrode 21 may each independently have an average thickness in a range of 50 μm to 500 μm, and specifically, 50 μm to 400 μm, 50 μm to 300 μm, 50 μm to 200 μm, 50 μm to 150 μm, 80 μm to 140 μm, 100 μm to 500 μm, 250 μm to 500 μm, 100 μm to 300 μm, 150 μm to 250 μm, 180 μm to 290 μm, 140 μm to 260 μm, or 80 μm to 170 μm.

Furthermore, the separators 22 and 23 may be formed of a polymer solid electrolyte film that allows lithium ions to pass therethrough. Alternatively, as the separators 22 and 23, a sheet or nonwoven fabric made of chemically resistant and hydrophobic polypropylene, glass fiber, polyethylene, or the like may be used, and in some cases, a composite separator in which inorganic particles/organic particles are coated with an organic binder polymer on a porous polymer substrate such as the sheet or nonwoven fabric may be used. In addition, an average pore diameter of each of the separators 22 and 23 may be in a range of 0.01 to 10 μm, and an average thickness thereof may be in a range of 5 μm to 100 μm, and specifically, 5 μm to 80 μm, 5 μm to 60 μm, 5 μm to 30 μm, 5 μm to 20 μm, 10 μm to 50 μm, 10 μm to 30 μm, 8 μm to 20 μm, or 8 μm to 15 μm.

Furthermore, in some cases, the electrode assembly 20 according to the present invention may have a shape in which an outermost side thereof is taped to prevent the stacked electrode assembly 20 from being twisted and the separation distance of the inserted positive electrodes 24a and 24b thus changing or the end portions of the positive electrodes 24a and 24b being exposed to the outside after the plurality of positive electrodes 24a and 24b are individually inserted inside the separators 22 and 23 bent along the negative electrode 21. Here, the taping may be performed using an insulating tape commonly used in the art.

Since the electrode assembly according to the present invention has the configuration described above, the electrode assembly may include a structure in which the negative electrode 21 having the separators 22 and 23 disposed on both surfaces thereof is bent in a zigzag shape, and the plurality of positive electrodes 24a and 24b are individually inserted inside the separators 22 and 23, which are bent together with the negative electrode 21, so that the rigidity of the electrode assembly 20 may be improved, thereby realizing high safety of the battery. In addition, in the electrode assembly 20 of the present invention, the end portions of the inserted positive electrodes 24a and 24b may be prevented from being exposed by realizing the variation A of the separation distances of the end portion of any positive electrode 24a and the end portion of the positive electrode 24b adjacent to the positive electrode 24a with respect to the side surface including the bent structure of the negative electrode 21 to have a predetermined ratio, so that the safety of the battery is further improved, and a unit area of the inserted positive electrodes 24a and 24b may be increased, thereby improving energy density of battery.

Secondary Battery

Further, one embodiment of the present invention provides a secondary battery including the above-described electrode assembly of the present invention.

The secondary battery according to the present invention has a configuration including an electrode assembly including a positive electrode, a negative electrode, and separators and a case in which the electrode assembly and an electrolyte are embedded, wherein the negative electrode has a stacked structure in which the separators are disposed on both surfaces thereof and bent m times (where m is an integer satisfying $2 \leq m \leq 100$) in a zigzag shape, the positive electrode has a structure in which n+1 positive electrodes (where n is an integer satisfying $1 \leq n \leq 99$ and m=n+1) are individually inserted inside the separators bent along the negative electrode, and a separation distance of an end portion of an $n^{th}$ inserted positive electrode and a separation distance of an end portion of an $(n+1)^{th}$ inserted positive electrode with respect to a side surface including the bent structure of the negative electrode have a variation of 10 μm to 2 mm.

The secondary battery according to the present invention includes the above-described electrode assembly of the present invention, and thus has advantages of high battery safety as well as excellent energy density.

Here, the positive electrode and the negative electrode included in the electrode assembly may each include a coated portion, in which a current collector is coated with a mixture including an active material, and an uncoated portion, in which the mixture is not coated, and each uncoated portion may be provided on a side surface of the electrode assembly, which is adjacent to the side surface including a bent portion.

Specifically, FIGS. 4 and 5 respectively illustrate structures of electrode assemblies 40 and 50 before and after the electrode assembly according to the present invention is bent, and the electrode assemblies 40 and 50 of the present invention may each include an uncoated portion 442 and 542 of a positive electrode 44 and an uncoated portion 412 and 512 of a negative electrode 41 on a side surface adjacent to the side surface including the bent portion.

Specifically, the positive electrode uncoated portion 442 and the negative electrode uncoated portion 412 are portions to which a positive electrode tab 56 and a negative electrode tab 55 are connected by welding, respectively, and may be provided on the same side surface of the electrode assembly 40, and in some cases, as shown in FIGS. 4 and 5, the positive electrode uncoated portion 442 and the negative electrode uncoated portion 412 may be provided on both side surfaces of the electrode assembly 40 to be disposed on opposite sides to each other.

Further, when the positive electrode uncoated portions 442 and 542 and the negative electrode uncoated portions 412 and 512 are provided on the same side surface, the positive electrode uncoated portions 442 and 542 and the negative electrode uncoated portions 412 and 512 may be provided to be spaced apart from each other.

In addition, the negative electrode uncoated portions 412 and 512 may each be disposed at regular intervals in a length direction of the negative electrode 41 to be stacked on the same line and bonded after the negative electrode 41 and separators 42 and 43 are bent.

Furthermore, the negative electrode uncoated portions 412 and 512 may each be appropriately modified according to the output of the secondary battery, and for example, may be formed to correspond to the number of the positive electrodes 44 or may be formed in a different number from the positive electrodes 44.

As an example, the negative electrode uncoated portions 412 and 512 may each be disposed at a center of a side surface of the electrode assembly 40 adjacent to the side surface including a bent portion 45, and in this case, each of the negative electrode uncoated portions 412 and 512 may have a width that is ⅓ times to ⅔ times of a width of the side surface on which each of the uncoated portions 412 and 512 is disposed.

Meanwhile, any electrolyte commonly used in the art may be applied as the electrolyte of the secondary battery according to the present invention with no particular limitation.

Specifically, the above electrolyte may include an electrolyte and a lithium salt, and the electrolyte may be a non-aqueous organic solvent, an organic solid electrolyte, an inorganic solid electrolyte, and the like.

Examples of the non-aqueous organic solvent may include an aprotic organic solvent such as N-methyl-2-pyrrolidinone, ethylene carbonate, propylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, an ether, methyl pyropionate, ethyl propionate, or the like.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymeric materials containing ionic dissociation groups.

Examples of the inorganic solid electrolyte may include nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt is a material easily soluble in the non-aqueous electrolyte, and examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, a lower aliphatic lithium carboxylate, lithium tetraphenylborate, an imide, or the like.

Furthermore, as the battery case of the secondary battery according to the present invention, a battery case commonly used in the art may be applied, and specific examples of the battery case may include a cylindrical case, a pouch-type case, a prismatic case, and the like.

As an example, the battery case may be a pouch-type case, and in this case, the pouch may be formed in a multi-layered sheet structure surrounding an outside of the electrode assembly. For example, the pouch may include a polymer sheet having an insulating and thermal fusion function, a composite nylon sheet that forms an outer surface and protects the inside, and a metal sheet that is provided therebetween and imparts mechanical strength.

MODES OF THE INVENTION

Hereinafter, the present invention will be described in more detail with reference to Examples and Experimental Example.

However, Examples and Experimental Example described below are for exemplifying the present invention, and the content of the present invention is not limited thereto.

Example 1

A band-shaped negative electrode including negative electrode mixture layers containing graphite as an active material on both surfaces of a copper current collector, a polypropylene separator, and a plate-shaped positive electrode including positive electrode mixture layers containing lithium nickel cobalt manganese oxide as an active material on both surfaces of an aluminum current collector were each prepared.

Thereafter, the polypropylene separator was disposed on both surfaces of the negative electrode, and the negative electrodes were stacked while the positive electrodes were inserted one by one inside bent portions, which were formed by bending the negative electrode and the separators, and then a circumference of the stack was taped with an insulating tape to manufacture an electrode assembly having a cross-sectional structure as shown in FIG. 2.

At this time, average thicknesses of the positive electrode, the negative electrode, and the separator were 180 μm, 140 μm, and 12 μm, respectively, and the number of times the negative electrode having the separators disposed on both surfaces was bent was 50 times.

In addition, in the electrode assembly, a separation distance B of an end portion of each of the inserted positive electrodes with respect to a side surface of the electrode assembly including the bent portion was adjusted to 90±5 μm. In addition, a variation A of a separation distance of an end portion of an $n^{th}$ inserted positive electrode and a separation distance of an end portion of an $(n+1)^{th}$ inserted positive electrode was 110±5 μm.

Example 2

A band-shaped negative electrode including negative electrode mixture layers containing graphite as an active material on both surfaces of a copper current collector, a polypropylene separator, and a plate-shaped positive electrode including positive electrode mixture layers containing lithium nickel cobalt manganese oxide as an active material on both surfaces of an aluminum current collector were each prepared.

Thereafter, the polypropylene separator was disposed on both surfaces of the negative electrode, and the negative electrodes were stacked while the positive electrodes were inserted one by one inside bent portions, which were formed by bending the negative electrode and the separators, to manufacture an electrode assembly having a cross-sectional structure as shown in FIG. 3.

At this time, average thicknesses of the positive electrode, the negative electrode, and the separator were 180 μm, 140 μm, and 12 μm, respectively, and the number of times the negative electrode having the separators disposed on both surfaces was bent was 50 times.

In addition, in the electrode assembly, a separation distance A+B of an end portion of each of the inserted positive electrodes with respect to a side surface of the electrode assembly including the bent portion was adjusted to 1,200±5 μm. In addition, a variation A of a separation distance of an end portion of an $n^h$ inserted positive electrode and a separation distance of an end portion of an $(n+1)^h$ inserted positive electrode was 1,000±5 μm.

Comparative Example 1

A band-shaped negative electrode including negative electrode mixture layers containing graphite as an active material on both surfaces of a copper current collector, a polypropylene separator, and a plate-shaped positive electrode including positive electrode mixture layers containing lithium nickel cobalt manganese oxide as an active material on both surfaces of an aluminum current collector were each prepared.

Thereafter, the polypropylene separator was disposed on both surfaces of the negative electrode, and the negative electrodes were stacked while the positive electrodes were inserted one by one inside bent portions, which were formed by bending the negative electrode and the separators, to manufacture an electrode assembly having a cross-sectional structure as shown in FIG. 1.

At this time, average thicknesses of the positive electrode, the negative electrode, and the separator were 180 μm, 140 μm, and 12 μm, respectively, and the number of times the negative electrode having the separators disposed on both surfaces was bent was 50 times.

In addition, in the electrode assembly, a separation distance S of an end portion of each of the inserted positive electrodes with respect to a side surface of the electrode assembly including the bent portion was adjusted to 200±5 μm. In addition, a variation A of a separation distance of an end portion of an $n^h$ inserted positive electrode and a separation distance of an end portion of an $(n+1)^{th}$ inserted positive electrode was 0 μm.

Experimental Example

In order to evaluate battery safety and energy density of the electrode assembly according to the present invention, the electrode assembly manufactured in each of Examples and Comparative Example was inserted into a pouch, and an electrolyte was injected therein, followed by sealing the same to manufacture a secondary battery, and the following evaluations were performed.

A) Evaluation of Nail Penetration

Each of the secondary batteries including the electrode assemblies manufactured in Examples and Comparative Example was fully charged under conditions of 4.2 to 4.25 V. Thereafter, a nail penetration tester was used to penetrate a center of the battery made above with a nail with a diameter of 1 to 3 mm made of iron to measure whether ignition occurred and a maximum temperature of an unignited battery. At this time, a penetration speed of the nail was constant at 0.1 to 80 m/min, and the results are shown in Table 1 below.

B) Evaluation of Battery Energy Density

The secondary battery including the electrode assembly of each of Examples and Comparative Example was charged/discharged to analyze energy per unit volume. At this time, the charging and discharging were performed between 2.5 V and 4.2 V, and charging was measured at a constant current and a constant voltage (CC/CV) and discharging was measured at CC. An energy of 3 C was confirmed under the condition that 1 C is 60 A in measuring C-rates, and each energy density measured on the basis of the energy density of Example 1 was relatively compared, and the results are shown in Table 1.

C) Evaluation of Precipitation of Lithium Metal

Each of the secondary batteries having been charged and discharged was disassembled to confirm whether the lithium metal was precipitated on a surface of the negative electrode. A case in which the lithium metal was precipitated on the surface of the disassembled negative electrode was indicated by "O," and a case in which the lithium metal was not precipitated on the surface of the disassembled negative electrode was indicated by "X."

TABLE 1

| | Ignition | Maximum temperature of unignited battery | Ratio of energy density compared to Example 1 | Lithium metal precipitation |
|---|---|---|---|---|
| Example 1 | No | 82.1° C. | 100% | X |
| Example 2 | No | 80.4° C. | 91% | X |
| Comparative Example 1 | No | 91.7° C. | 85% | X |

As shown in above Table 1, it can be seen that the safety and energy density of the battery are all excellent in the case of the battery including the electrode assembly according to the present invention.

From this result, the electrode assembly according to the present invention may improve rigidity of the electrode assembly by having a structure in which a negative electrode having separators disposed on both surfaces thereof is bent in a zigzag shape, and a plurality of positive electrodes are individually inserted inside separators bent together with the negative electrode, thereby realizing high safety of the battery. In addition, the electrode assembly may prevent an end portion of the inserted positive electrode from being exposed by realizing a variation between a separation distance of an end portion of any positive electrode and a separation distance of an end portion of a positive electrode adjacent to the positive electrode with respect to a side surface including the bent structure of the negative electrode at a predetermined ratio, so that the safety of the battery may be improved and also a unit area of the inserted positive electrode may be increased, thereby improving energy density of battery.

While the present invention has been described with reference to the exemplary embodiments thereof, it will be understood by those skilled in the art that various changes in form and details may be made therein without departing from the spirit and technical scope of the present invention as defined by the appended claims.

Therefore, the technical scope of the present invention should not be limited to the content described in the detailed description of the specification but should be determined by the scope of the appended claims.

DESCRIPTION OF REFERENCE NUMERALS

10: conventional electrode assembly
20, 30, 40, and 50: electrode assemblies according to present invention
11, 21, 31, and 41: negative electrodes
11a, 21a, and 31a: $m^{th}$ bent portions of negative electrodes
11b, 21b, and 31b: $(m+1)^{th}$ bent portions of negative electrodes
12, 22, 32, and 42: first separators
13, 23, 33, and 43: second separators
14: positive electrode
24a and 34a: $n^{th}$ inserted positive electrodes
24b and 34b: $(n+1)^{th}$ inserted positive electrodes
41: negative electrode
411: coated portion of negative electrode
412 and 512: uncoated portions of negative electrodes
42 and 43: separators
44: positive electrode
441: coated portion of positive electrode
442 and 542: uncoated portions of positive electrodes
45: bent position of electrode assembly

55: negative electrode tab
56: positive electrode tab
A: variation of separation distance of end portion of $n^{th}$ inserted positive electrode and separation distance of end portion of $(n+1)^{th}$ inserted positive electrode
L: inside of bent separator
S: separation distance between outer side of electrode assembly and end portion of positive electrode
D: side surface of electrode assembly including bent portion

The invention claimed is:

1. An electrode assembly comprising:
a plurality of positive electrodes;
a negative electrode; and
a pair of separators,
wherein the plurality of positive electrodes, the negative electrode, and the pair of separators are arranged along a stacking direction to define a stack,
wherein the negative electrode has the pair of separators disposed on opposing surfaces of the negative electrode, and the negative electrode and the separators are collectively bent m times (where m is an integer satisfying 2≤m≤100) to follow a serpentine path traversing back and forth across the stack in a lateral dimension transverse to the stacking direction so as to define a plurality of layers, wherein outermost extremities of the negative electrode and the pair of separators in a first direction along the lateral dimension collectively define an outer side of the stack,
wherein the plurality of positive electrodes includes n+1 positive electrodes (where n is an integer satisfying 1≤n≤99 and m=n+1) individually positioned between respective layers of the serpentine path defined by the negative electrode and the pair of separators, wherein each of the plurality of positive electrodes has an end portion at an outer edge of the respective positive electrode in the first direction along the lateral dimension, the end portions of the plurality of positive electrodes each being spaced in the lateral dimension from the outer side of the stack by a respective separation distance, wherein at least one of the end portions of the plurality of positive electrodes contacts at least one of the pair of separators, and
wherein the separation distance of an $n^{th}$ one of the plurality of positive electrodes and the separation distance of an $(n+1)^{th}$ one of the plurality of positive electrodes vary from one another by an amount within a range of 10 μm to 2 mm.

2. The electrode assembly of claim 1, wherein the separation distance of the $n^{th}$ one of the plurality of positive electrodes and the separation distance of the $(n+1)^{th}$ one of the plurality of positive electrodes vary from one another by an amount within a range of 10 μm to 500 μm.

3. The electrode assembly of claim 1, wherein the separation distance of the $n^{th}$ one of the plurality of positive electrodes and the separation distance of the $(n+1)^{th}$ one of the plurality of positive electrodes vary from one another by an amount within a range of 500 μm to 2,000 μm.

4. The electrode assembly of claim 1, wherein the end portions of the positive electrodes adjacent to the outer side of the stack which are not enveloped by a bend of the serpentine path have respective separation distances in a range of 50 μm to 150 μm.

5. The electrode assembly of claim 1, wherein the end portions of the positive electrodes adjacent to the outer side of the stack which are not enveloped by a bend of the serpentine path have respective separation distances in a range of 400 μm to 2,000 μm.

6. The electrode assembly of claim 1, wherein an average thickness of the negative electrode is in a range of 50 μm to 500 μm.

7. The electrode assembly of claim 1, wherein an average thickness of the separator is in a range of 5 μm to 100 μm.

8. The electrode assembly of claim 1, wherein an average thickness of the positive electrode is in a range of 50 μm to 500 μm.

9. The electrode assembly of claim 1, wherein the negative electrode and the pair of separators are collectively bent 20 times to 60 times in the serpentine path.

10. A secondary battery comprising:

the electrode assembly of claim 1; and a case in which the electrode assembly and an electrolyte are configured to be included.

11. The secondary battery of claim 10, comprising:

a positive electrode tab; and a negative electrode tab;

wherein the positive electrode tab and the negative electrode tab are connected to one of the positive electrodes and the negative electrode of the electrode assembly, respectively, and the positive electrode tab and the negative electrode tab extend outside to an exterior of the case, wherein the positive electrode tab and the negative electrode tab are located on a side surface of the electrode assembly extending parallel to both the lateral dimension and the stacking direction.

* * * * *